(12) United States Patent
Wu et al.

(10) Patent No.: US 7,183,751 B2
(45) Date of Patent: Feb. 27, 2007

(54) REACTIVE POWER COMPENSATOR DEVICE

(75) Inventors: Chin-Chang Wu, Kaohsiung (TW);
Hung-Liang Chou, Kaohsiung (TW);
Wen-Pin Hsu, Kaohsiung (TW);
Yao-Jen Chang, Kaohsiung (TW)

(73) Assignee: UIS Abler Electronics Co., Ltd., Hsintien (TW)

( * ) Notice: Subject to any disclaimer, the term of this patent is extended or adjusted under 35 U.S.C. 154(b) by 92 days.

(21) Appl. No.: 11/044,026

(22) Filed: Jan. 28, 2005

(65) Prior Publication Data

US 2005/0212494 A1  Sep. 29, 2005

(30) Foreign Application Priority Data

Mar. 24, 2004  (TW) ............................... 93107981 A

(51) Int. Cl.
*G05F 1/70* (2006.01)
(52) U.S. Cl. ..................................... 323/207
(58) Field of Classification Search ................ 323/207; 307/105, 98, 99, 40
See application file for complete search history.

(56) References Cited

U.S. PATENT DOCUMENTS

| | | | |
|---|---|---|---|
| 4,812,669 A * | 3/1989 | Takeda et al. ............... 307/105 |
| 5,187,427 A | 2/1993 | Erdman |
| 5,321,598 A * | 6/1994 | Moran ........................... 363/41 |
| 5,329,221 A | 7/1994 | Schauder |
| 5,465,203 A * | 11/1995 | Bhattacharya et al. ......... 363/40 |
| 5,573,090 A * | 11/1996 | Ross ............................. 191/10 |
| 5,642,275 A | 6/1997 | Peng et al. |
| 5,672,956 A | 9/1997 | Fukui et al. |
| 5,677,832 A * | 10/1997 | Tissier et al. .................. 363/41 |
| 5,757,099 A * | 5/1998 | Cheng et al. ................ 307/105 |
| 5,969,509 A | 10/1999 | Thorvaldsson |
| 6,462,519 B1 | 10/2002 | McDaniel et al. |
| 6,876,179 B2 * | 4/2005 | Chou et al. .................. 323/207 |

* cited by examiner

*Primary Examiner*—Shawn Riley
(74) *Attorney, Agent, or Firm*—Bacon & Thomas, PLLC

(57) ABSTRACT

A reactive power compensator device includes an AC capacitor and a small-capacity power converter serially connected thereto that avoid the problems of power resonance and harmonic current injection. The reactive power compensator device provides with compensation reactive power current with fixed amplitude or adjustable amplitude. The power converter permits one of power lines of a power system to be connected to either a positive or negative dc terminal of the power electronic switch set through no power electronic switch. Consequently, the number of the power electronic switches is reduced.

14 Claims, 6 Drawing Sheets

REACTIVE POWER COMPENSATOR DEVICE

BACKGROUND OF THE INVENTION

1. Field of the Invention

The present invention relates to a reactive power compensator device. More particularly, the present invention relates to the reactive power compensator device employing an AC capacitor and a power converter serially connected thereto, thereby compensating for reactive power to a distribution power system.

2. Description of the Related Art

Conventionally, most of loads in the distribution power system have the characteristic of inductance, and it will result in the poor power factor. Hence, it requires a larger current for transmitting the identical real power that reduces the power efficiency of distribution power system and degrades the performance of voltage regulation of the load side. For solving the above problems, power substations and power consumers generally install a passive type reactive power compensator (AC capacitors) parallel connected to the distribution power system, so as to compensate a lagging reactive power to increase the entire power factor. In some distribution power systems, the capacity of applied AC capacitor is about 25% to 35% of total capacity, and in some other distribution power systems have even exceeded about 50%, according to research reports.

However, the AC capacitors directly connect to the distribution power system in parallel have some disadvantageous. The AC capacitor merely provides with the fixed reactive power compensation that cannot be adjusted in response to the load variation that may cause high-voltage due to over-compensating the reactive power in the condition of light load. In consequence, high-voltage caused by the over-compensating reactive power may damage the other power facilities.

Recently, the harmonic pollution in the distribution power system becomes seriously due to the wide use of nonlinear loads. In the distribution power system, the AC capacitor used for power factor correction provides with a low impedance path for harmonic current, hence the AC capacitor is frequently damaged by harmonics. Meanwhile, it results in the power resonance between the AC capacitor and the reactance of the distribution power system. Then, it will result in the amplification of harmonic current and harmonic voltage. Thus, the damage of the AC capacitor due to over-voltage or over-current may occur. Besides, the over-voltage of AC capacitor caused by the power resonance may damage the neighboring electric power facilities and even result in public accidents. Consequently, it may affect the power quality and reliability for power supply.

In order to solve the power resonance problem caused by the AC capacitor, the voltage rating of AC capacitor is increased to thereby avoid the damage of over-voltage according to the conventional solution. However, it cannot eliminate the power resonance problem thoroughly and still, inevitably, remains the damage of neighboring power facilities.

There is another solution that the AC capacitor is switched off from the power system when over-voltage or over-current of the AC capacitor occurs. Hence, the function of reactive power compensation will be disabled.

To properly adjust reactive power provided by the AC capacitor and avoid the over-compensating reactive power in the condition of light load, a thyristor-controlled AC capacitor is disclosed in many patents, U.S. Pat. Nos. 5,969,509 and 6,462,519 for example. The thyristor switch is employed to control the capacitance of the AC capacitor for injecting reactive power into the distribution power system. However, the reactive power compensation is only adjusted step by step and cannot be adjusted in linear. Furthermore, U.S. Pat. No. 5,672,956 discloses a thyristor switch serially connected to a reactor that further connects to such an AC capacitor in parallel. In operation, the reactive power compensation can be adjusted in linear by controlling a firing angle of the thyristor switch. However, it may generate harmonic problem in the distribution power system.

The two above-mentioned solutions still employ the AC capacitor to connect to the distribution power system and cannot effectively eliminate the problems of power resonance and the injection of neighboring harmonic current that may damage the neighboring electric power facilities.

In order to solve the application problem of the AC capacitor for reactive power compensation, U.S. Pat. Nos. 5,187,427 and 5,329,221 disclose a power converter based reactive power compensator, as shown in FIG. 1. The power converter connects to the distribution power system via a filtering inductor. A DC side of the power converter further connects with a DC capacitor. Accordingly, the power converter can provide with either of a leading reactive power or a lagging reactive power by means of controlling the operation of the power converter. This means that the reactive power can be adjusted in linear. Advantageously, no power resonance problem occurs between the power converter and the distribution power system, and no problem of harmonic current injection due to neighboring nonlinear load. However, the power converter is employed to provide the entire reactive power compensation. Hence, the capacity of the power converter must be larger to provide the entire reactive power compensation in response to the full range load variation. Consequently, it may increase technical difficulty and manufacturing cost that limits the wide application of the power converter. Furthermore, U.S. Pat. No. 5,642,275 discloses a plurality of stacked power converters for large capacity reactive power compensation. However the manufacturing cost is still high.

The present invention intends to provide a reactive power compensator device employing an AC capacitor and a power converter serially connected thereto that can eliminate the problems of power resonance and the injection of neighboring harmonic current. The reactive power compensator device employs lower capacity and lesser number of power electronic switches of the power converter in such a way to mitigate and overcome the above technical problems of U.S. Pat. Nos. 5,187,427, 5,329,221 and 5,642,275.

SUMMARY OF THE INVENTION

The primary objective of this invention is to provide a reactive power compensator device employing an AC capacitor and a power converter serially connected thereto. The reactive power compensator device provides a sine-wave current with a 90° leading with the feeder voltage. The power converter consists of a DC capacitor, a power electronic switch set, a high-frequency ripple filter and a controller that permits the power converter to employ a lesser number of power electronic switches because of lack of an arm of the power electronic switch set. When the power converter is applied to a single-phase power system, only a single-arm structure (i.e. two power electronic switches) of the power converter is provided. When the power converter is applied to a three-phase, three-wire power system, only a double-arm structure (i.e. four power electronic switches) of the power converter is provided. When the power converter is applied to a three-phase, four-wire power system, only a triple-arm structure (six power electronic switches) of the power converter is provided. Consequently, the power converter can reduce the number of the power electronic switches.

The secondary objective of this invention is to provide the reactive power compensator device employing a small capacity power converter serially connected to an AC capacitor. Thereby, it can eliminate problems of the power resonance and the injection of harmonic current that may damage the AC capacitor and neighboring electric power facilities.

The third objective of this invention is to provide the reactive power compensator device employing a small capacity power converter serially connected to an AC capacitor. Thereby, it can provide with a reactive power adjusted within a predetermined range in response to the load variation.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings wherein.

DETAILED DESCRIPTION OF THE INVENTION

Figure 2:
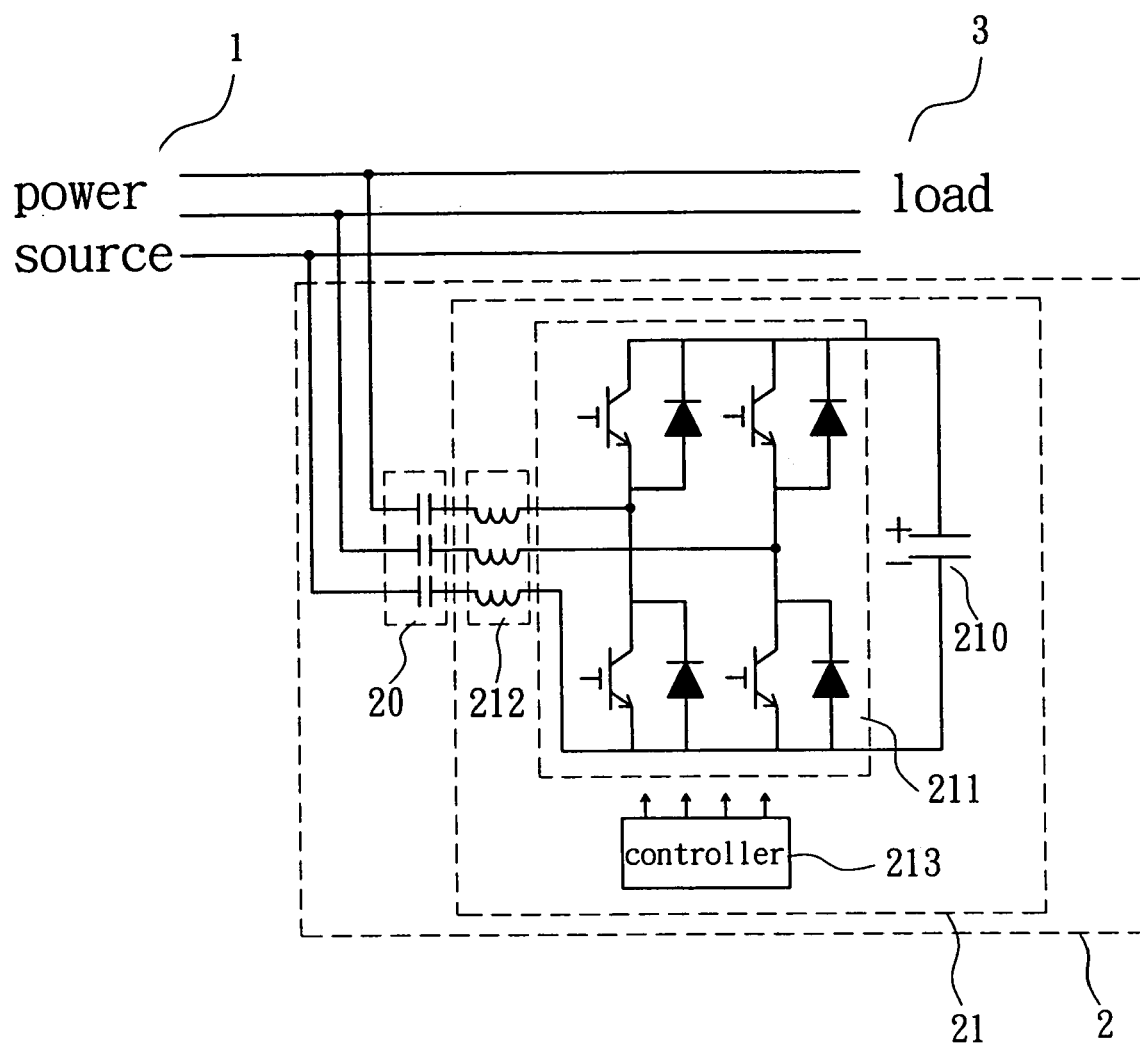
FIG. 2 is a schematic circuitry of a reactive power compensator device in accordance with a first embodiment of the present invention applied to a three-phase, three-wire power system.

Referring to FIG. 2, it illustrates a schematic circuitry of a reactive power compensator device in accordance with a first embodiment of the present invention applied to a three-phase, three-wire power system. A power source 1 of the three-phase, three-wire power system supplies a three-phase, three-wire power to a load 3.

Referring again to FIG. 2, in the illustrated first embodiment, the reactive power compensator device 2 is applied to the three-phase, three-wire power system. Generally, the reactive power compensator device 2 consists of an AC capacitor set 20 and a power converter 21 serially connected thereto. Basically, the AC capacitor set 20 includes three AC capacitor sets that are applied to the three-phase, three-wire power system and adapted to provide with a fundamental reactive power. The AC capacitor set 20 is also used to withstand major fundamental component of voltage generated from the power source 1 that may reduce the capacity of the power converter 21. Additionally, the AC capacitor set 20 can also block the DC voltage generated from the power converter 21 to the power source 1.

Still referring to FIG. 2, the power converter 21 is used to solve the power resonance and the harmonic current injection problems of AC capacitor, or permits the reactive power compensator device 2 to provide with a compensation reactive power that can be adjusted within a predetermined range in response to the load variation. Basically, the power converter 21 consists of a DC capacitor 210, a power electronic switch set 211, a high-frequency ripple filter 212 and a controller 213. The dc capacitor 210 acts as an energy buffer, and provides with a DC voltage for normally operating the power converter 21. The power electronic switch set 211 has a double-arm bridge structure and each arm of which includes a pair of power electronic switches. Each power electronic switch consists of a controllable switching device (such as IGBT, POWER MOSFET) and a diode. The double-arm bridge structure of the power electronic switch set 211 contains two DC terminals and two AC terminals. A connection point between the two power electronic switches of each arm of the bridge structure is regarded as one of the two AC terminals. The other two terminals of the bridge structure are the two DC terminals denoted as a positive DC terminal and a negative DC terminal. Two DC terminals of the power electronic switch set 211 are connected to the dc capacitor 210.

The high-frequency ripple filter 212 is an inductor set adapted to filter a high-frequency ripple current which is generated by switching operation of the power electronic switch set 211. The controller 213 generates a drive signal and sends it to control the power electronic switch set 211.

In the illustrated first embodiment, since the power converter 21 connects to the power source 1 through the AC capacitor set 20, the AC capacitor set 20 can effectively block the DC voltage generated from the power converter 21 to the power source 1. Hence, only a double-arm structure of the power electronic switch set 211 is required when the power converter 21 is applied to a three-phase, three-wire power system. Basically, the three-phase, three-wire power system includes three power lines, as shown in the upper portion of FIG. 2. Any of two power lines of the power source 1 connect with the two AC terminals of the power converter 211 through any of two power capacitors of the AC capacitor set 20 and the high-frequency ripple filter 212. Another power line of the power source 1 connects with a negative DC terminal of the power electronic switch set 211 through another power capacitor of the AC capacitor set 20 and the high-frequency ripple filter 212.

In operation, switching the power electronic switch set 211 controls the compensation currents of the two phases of the reactive power compensator device 2 which are connected to two AC terminals of power electronic switch set 211. The sum of three-phase currents of the three-phase, three-wire power system is zero. In the illustrated first embodiment, if two phases' compensation currents, generated by the power converter 21, are accurate, the reactive power compensation supplying from another phase (third phase) is also accurate. When the three phases of the compensation currents are injected into the three power lines of the power source 1, the reactive power compensator device 2 can improve the input power factor.

Still referring to FIG. 2, the reactive power compensator device 2 includes the AC capacitor set 20 and the power converter 21 serially connected thereto such that the power converter 21 can control the reactive power compensator device 2 to provide a fundamental reactive power current with constant amplitude or adjustable amplitude. Thereby, it can avoid the power resonance problem between the AC capacitor set 20 and the reactance of power-source 1, and the problem of harmonic current injection from neighboring non-linear loads. Due to the existence of the AC capacitor set 20, the operating voltage of the DC capacitor 210 and the capacity of the power converter 21 can be lower. Thereby, the manufacture cost of the reactive power compensator device 2 applied in the distribution power system is reduced.

Furthermore, since the AC capacitor set 20 can effectively block a DC voltage generated from the power converter 21 to the power source 1, it permits the power converter 21 to omit one arm of the power electronic switch set 211. This means that two power electronics switches are reduced. In consequence, it permits one power line of the power source 1 to directly connect to the negative DC terminal of the power electronic switch set 211 through another power capacitor of the AC capacitor set 20 and the high-frequency ripple filter 212 without passing any power electronic switch in the power electronic switch set 211. Thereby, the manufacture cost of the reactive power compensator device 2 is more reduced.

Figure 1:
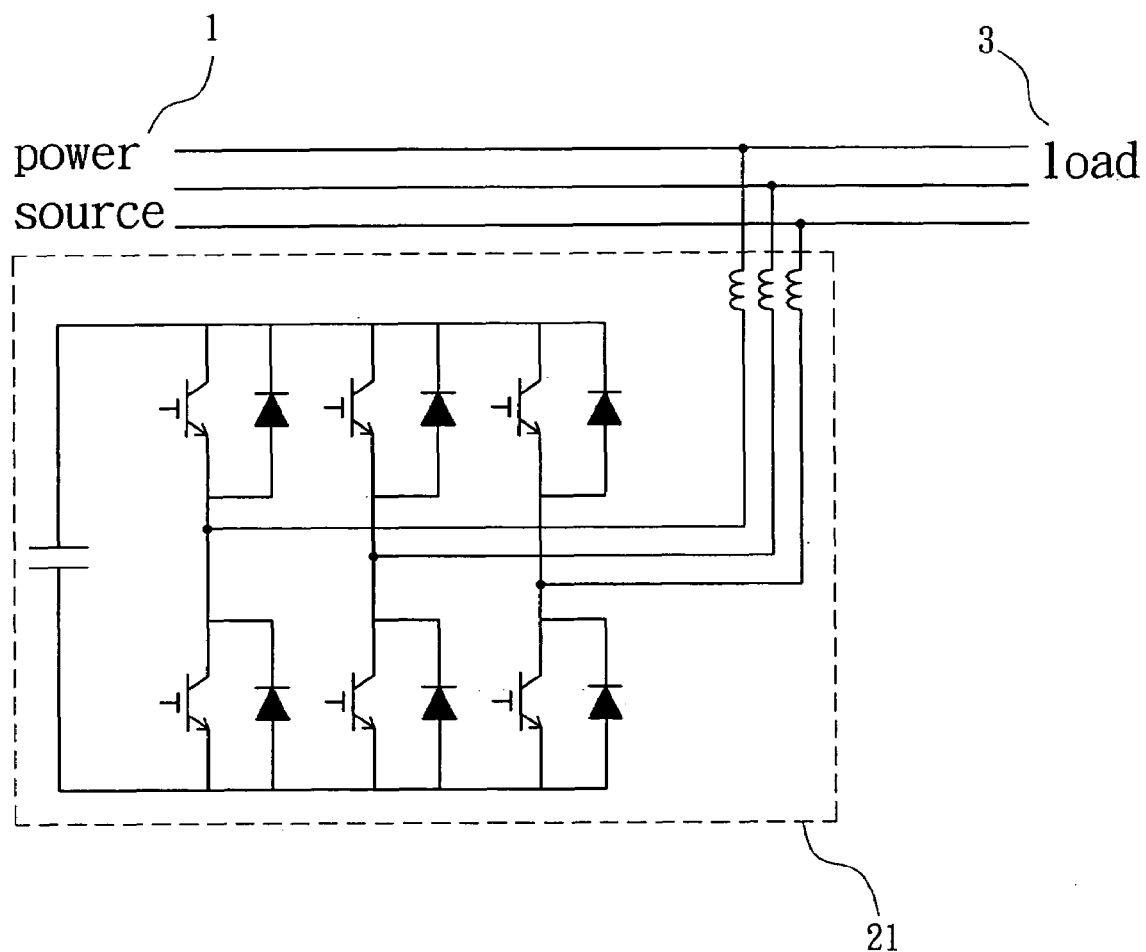
FIG. 1 is a schematic circuitry of a conventional single power converter for generating reactive power in accordance with the prior art.

Referring back to FIGS. 1 and 2, in comparison with the patents disclosed in U.S. Pat. Nos. 5,187,427 and 5,329,221, the manufacture cost of the reactive power compensator device 2 in accordance with the present invention is further reduced.

In the illustrated first embodiment, the AC capacitor set 20 can effectively block a DC voltage generated from the power converter 21 to the power source 1 that permits one power line of the power source 1 to directly connect to the negative DC terminal of the of the power electronic switch set 211 through another power capacitor of the AC capacitor set 20 and the high-frequency ripple filter 212. Alternatively, it also permits one power line of the power source 1 to directly connect to a positive DC terminal of the power electronic switch set 211 through another power capacitor of the AC capacitor set 20 and the high-frequency ripple filter 212 that accomplishes the same effect in operation.

In the illustrated first embodiment, the reactive power compensator device 2 must control the power converter 21 to provide fixed amplitude or adjustable amplitude of the fundamental reactive power current. Advantageously, it can avoid the power resonance problem caused by the AC capacitor set 20, and the harmonic current injection problem from neighboring non-linear loads. To this end, the power converter 21 is provided with the controller 213.

Figure 3:
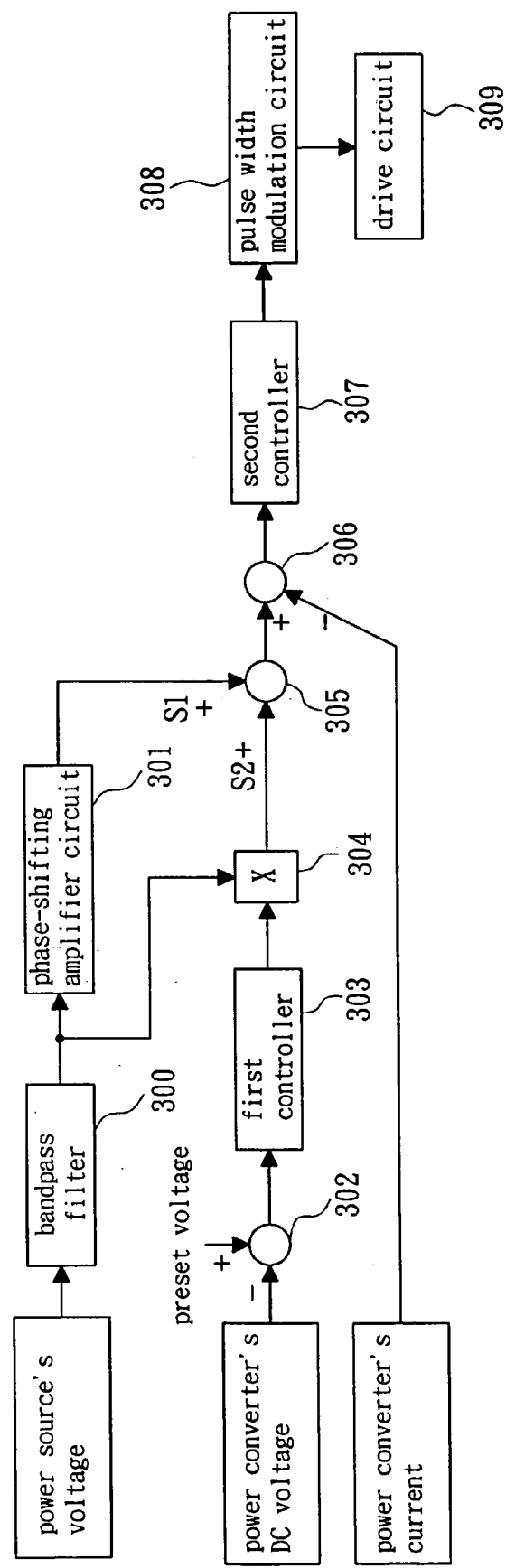
FIG. 3 is a schematic circuitry of a controller of the reactive power compensator device in accordance with the first embodiment of the present invention.

Turning now to FIG. 3, it illustrates a schematic circuitry of the controller 213 of the reactive power compensator device 2 in accordance with the present invention. The power converter 21 of the reactive power compensator device 2 adopts a current-mode control such that the power converter 21 only allows a fundamental reactive power current with fixed amplitude passing through the reactive power compensator device 2. In operation, a current passing through the reactive power compensator device 2 forms a fundamental-frequency sinusoidal waveform that can avoid the power resonance problem and the harmonic current injection problem from neighboring non-linear loads.

Still referring to FIGS. 2 and 3, the controller 213 of the power converter 21 has reference current signals consisting of a first control signal S1 and a second control signal S2. The first control signal S1 has fixed amplitude, and a sine wave with a 90° leading with voltage of power source 1. The amplitude of the first control signal S1 is the product of the admittance of the AC capacitor set 20 and the phase voltage of the power source 1. The voltage of the power source 1 passes through a band-pass filter 300 to obtain a fundamental component which is sent to a phase-shifting amplifier circuit 301 to thereby obtain a 90° leading with the phase voltage of the power source 1. Meanwhile, the gain of phase-shifting amplifier circuit 301 is predetermined to match as the product of the admittance of the AC capacitor set 20 and the phase voltage of the power source 1. Consequently, the phase-shifting amplifier circuit 301 generates the first control signal S1 to send it to an adder 305.

The second control signal S2 is used to stabilize the DC voltage of the power converter 21. In operation, the power converter 21 may result in power loss in itself that causes DC voltage of the power converter 21 up/down. To operate the power converter 21 in normal, a constant value of the DC voltage of the power converter 21 is required. The power converter 21 must absorb/generate a real power from/to the power source 1. This means that the reactive power compensator device 2 must generate a fundamental current with the same phase or out of phase with the phase voltage of the power source 1. For this purpose, the DC voltage of the power converter 21 is retrieved and sent to a subtracter 302 in which to subtract the DC voltage from a preset voltage. The result of the subtracter 302 is sent to a first controller 303. An output of the first controller 303 and the fundamental component of the band-pass filter 300 are sent to a multiplier 304 to obtain the second control signal S2. Subsequently, the first control signal S1 and the second control signal S2 are sent to an adder 305 to obtain a reference signal. The reference signal and the output current of the power converter 21 are further sent to a subtracter 306. An output of the subtracter 306 is further sent to a second controller 307 to obtain a modulation signal that is further sent to a pulse width modulation circuit 308 to obtain a pulse width modulation signal. Finally, the signal of the pulse width modulation circuit 308 is sent to a drive circuit 309 to generate the drive signals for the power electronic switches of the power converter 21.

Alternatively, in the illustrated first embodiment, the reactive power compensator device 2 must control the power converter 21 to provide with a fundamental reactive power that can be adjusted within a predetermined range in response to changes in loads. The compensation reactive power of the reactive power compensator device 2 can be adjusted in linear within a predetermined range.

Figure 4:
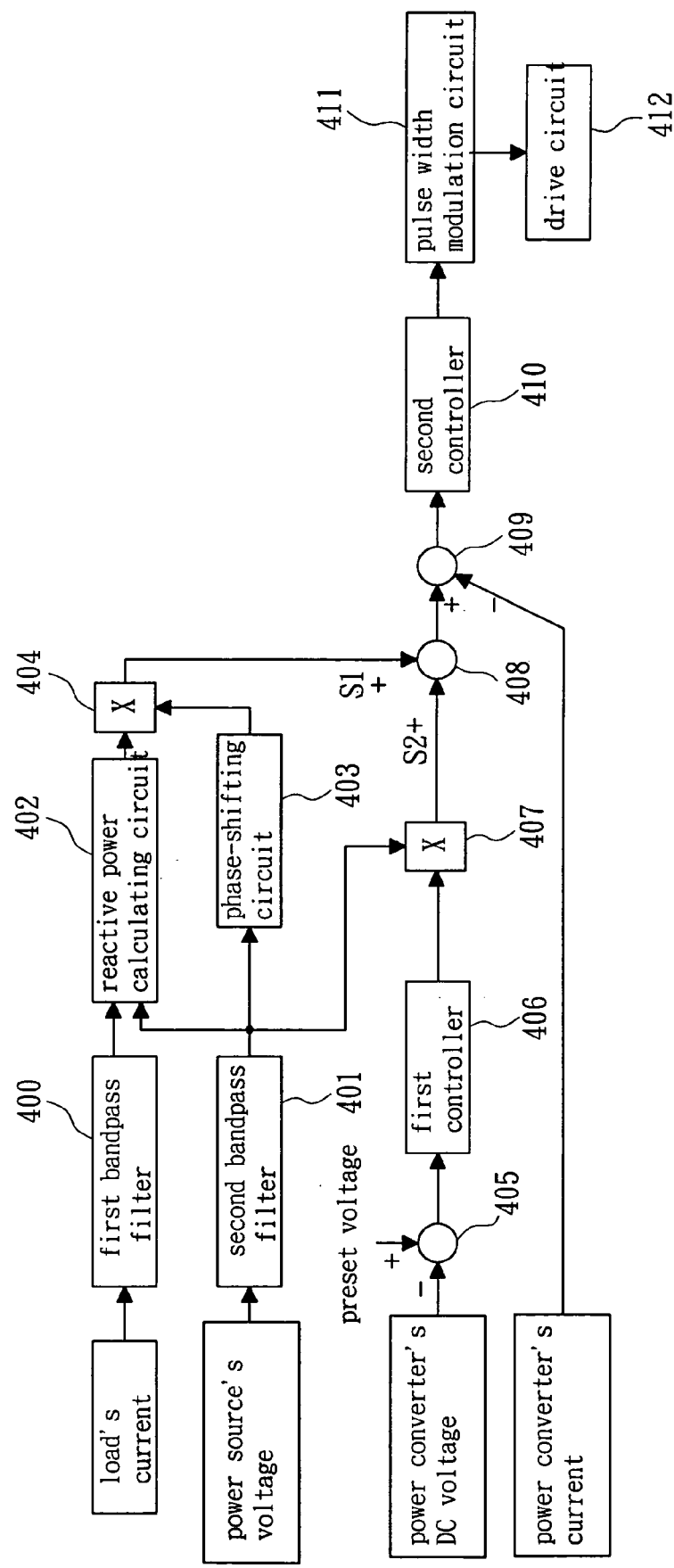
FIG. 4 is a schematic circuitry of another controller of the reactive power compensator device in accordance with the first embodiment of the present invention.

Turning now to FIG. 4, it illustrates a schematic circuitry of another controller 213 of the reactive power compensator device 2 in accordance with the present invention. The power converter 21 of the reactive power compensator device 2 adopts a current-mode control such that the power converter 21 allows a fundamental reactive power current with adjustable amplitude passing through the reactive power compensator device 2. In operation, a current passing through the reactive power compensator device 2 forms a fundamental-frequency sinusoidal waveform that can avoid the power resonance problem and the harmonic current injection problem from neighboring non-linear loads.

Still referring to FIGS. 2 and 4, the controller 213 of the power converter 21 has reference current signals consisting of a first control signal S1 and a second control signal S2. The first control signal S1 is mainly used to adjust reactive power generated from the reactive power compensator device 2. Since the power converter 21 adopts a current-mode control, the first control signal S1 has a sine wave with a 90° leading with phase voltage of power source 1. The current of the load 3 and the phase voltage of the power source 1 pass through a first band-pass filter 400 and a second band-pass filter 401 respectively to obtain the fundamental components which are sent to a reactive power calculating circuit 402 to thereby calculate a amplitude of compensating reactive power current for the reactive power compensator device 2. The reactive power calculating circuit 402 has an upper-limit and a lower-limit to restrict the range of compensating reactive power. The upper-limit and lower-limit of the reactive power calculating circuit 402 are determined by using the DC voltage of the power converter21. In order to determine a waveform of the reactive power current, the fundamental component of the second band-pass filter 401 is sent to a phase-shifting circuit 403 to thereby obtain a 90° leading with the phase voltage of power source 1. Outputs of the reactive power calculating circuit 402 and the phase-shifting circuit 403 are sent to a multiplier 404 to obtain the first control signal S1.

The second control signal S2 is used to stabilize the DC voltage of the power converter 21. In operation, the power converter 21 may generate power loss in itself that causes up/down the DC voltage of the power converter 21. To operate the power converter 21 normally, a constant DC voltage of the power converter 21 is required. The power converter 21 must absorb/generate a real power from/to the power source 1. This means that the reactive power compensator device 2 must generate a fundamental current component with the same phase or out of phase with the phase voltage of power source 1. For this purpose, the DC voltage of the power converter 21 is retrieved and sent to a subtracter 405 in which to subtract the DC voltage from a preset voltage. The result of the subtracter 405 is sent to a first controller 406. An output of the first controller 406 and the fundamental component of the second band-pass filter 401 are sent to a multiplier 407 to obtain the second control signal S2. Subsequently, the first control signal S1 and the second control signal S2 are sent to an adder 408 to obtain a reference signal. The reference signal and the output current of the power converter 21 are further sent to a subtracter 409. An output of the subtracter 409 is further sent to a second controller 410 to obtain a modulation signal that is further sent to a pulse width modulation circuit 411 to obtain a pulse width modulation signal. Finally, the signal of the pulse width modulation circuit 411 is sent to a drive circuit 412 to generate the drive signals for the power electronic switches of power converter 21.

Figure 5:
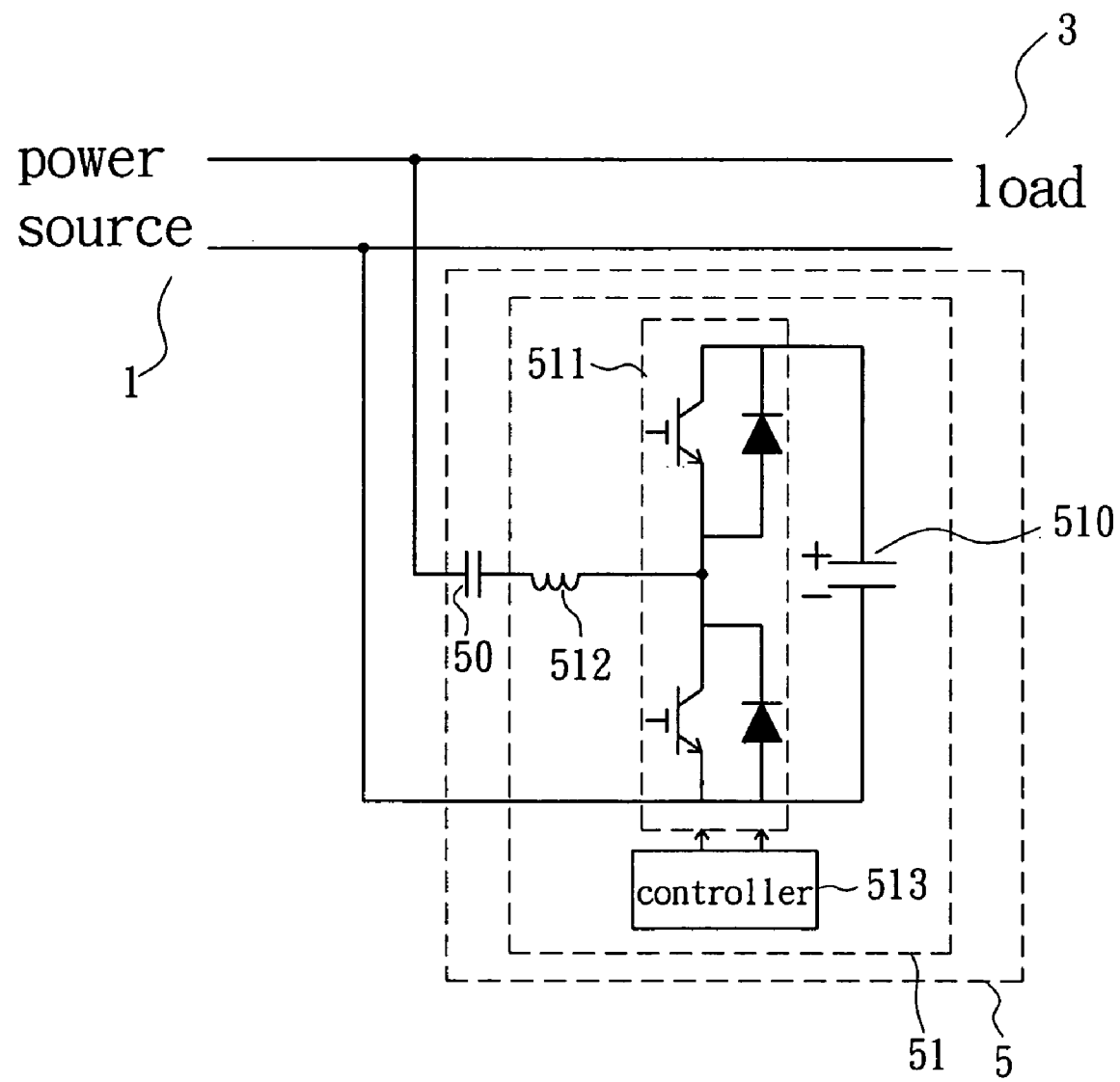
FIG. 5 is a schematic circuitry of a reactive power compensator device in accordance with a second embodiment of the present invention applied to a single-phase, two-wire power system.

Turning now to FIG. 5, it illustrates a schematic circuitry of a reactive power compensator device in accordance with a second embodiment of the present invention applied to a single-phase, two-wire power system. A power source 1 of the single-phase, two-wire power system supplies a single-phase, two-wire power to a load 3.

Still referring to FIG. 5, in the illustrated second embodiment, the reactive power compensator device 5 is applied to the single-phase, two-wire power system. Generally, the reactive power compensator device 5 consists of an AC capacitor set 50 and a power converter 51 serially connected thereto. Basically, the AC capacitor set 50 includes an AC capacitor that is applied to the single-phase, two-wire power system and adapted to provide with a fundamental reactive power. The fundamental reactive power from the AC capacitor 50 is used to withstand major fundamental components of voltage generated from the power source 1 that may lower the capacity of the power converter 51. Additionally, the AC capacitor set 50 can also block a DC voltage generated from the power converter 51 to the power source 1.

Still referring to FIG. 5, the power converter 51 is used to solve the power resonance and the harmonic current injection of AC capacitor, or permits the reactive power compensator device 5 to provide with a compensation reactive power that can be adjusted within a predetermined range in response to the load variation. Basically, the power converter 51 consists of a DC capacitor 510, a power electronic switch set 511, a high-frequency ripple filter 512 and a controller 513. The DC capacitor set 510 acts as an energy buffer, and provides with a DC voltage for normally operating the power converter 51.

The power electronic switch set 511 has a single-arm bridge structure that includes a pair of power electronic switches. Each power electronic switch consists of a controllable switching device (such as IGBT, POWER MOSFET) and a diode. The single-arm bridge structure of power electronic switch set 511 contains two DC terminals and one AC terminal. A connection point between the two power electronic switches of the arm of the bridge structure is regarded as the AC terminal. The other two terminals of the bridge structure are the two DC terminals denoted as a positive DC terminal and a negative DC terminal. The two DC terminals of the power electronic switch set 511 are connected to the DC capacitor 510. The high-frequency ripple filter 512 is an inductor adapted to filter a high-frequency ripple current which is caused by switching operation of the power electronic switch set 511. In switching operation, the controller 513 generates drive signals and sends it to control the power electronic switches of the power electronic switch set 511.

In the illustrated second embodiment, since the power converter 51 connects to the power source 1 through the AC capacitor set 50, the AC capacitor set 50 can effectively block a DC voltage generated from the power converter 51 to the power source 1. Hence, only a single-arm structure of the power electronic switch set 511 is required when the power converter 51 is applied to a single-phase, two-wire power system. Basically, the single-phase, two-wire power system includes two power lines, as shown in the upper portion of FIG. 5. One of the power lines of the power source 1 connects with the AC terminal of the power electronic switch set 511 through the AC capacitor set 50 and the high-frequency ripple filter 512. The other power line of the power source 1 directly connects to the negative DC terminal of power electronic switch set 511.

In operation, switching the power electronic switch set 511 controls the compensation current from the single phase of the reactive power compensator device 2. When the compensation current is injected into the power line of the power source 1, the reactive power compensator device 5 can improve the power factors of the loads 3.

Still referring to FIG. 5, the reactive power compensator device 5 includes the AC capacitor set 50 and the power converter 51 serially connected thereto such that the power converter 51 can control the reactive power compensator device 5 to provide with a fundamental reactive power current with fixed amplitude or adjustable amplitude. Thereby, it can avoid the power resonance problem between the AC capacitor set 50 and the reactance of the power source 1, and the problem harmonic current injection from neighboring non-linear loads. Due to the existence of the AC capacitor set 50, it can lower the operating voltage of the DC capacitor 510 and the capacity of the power converter 51. Thereby, the manufacture cost of the reactive power compensator device 5 applied in the distribution power system is reduced.

Furthermore, since the AC capacitor set 50 can effectively block a DC voltage generated from the power converter 51 to the power source 1, it permits the power converter 51 to omit one arm (two power electronic switches) of the power electronic switch set 511. In consequence, it permits one power line of the power source 1 to directly connect to the negative DC terminal of the power electronic switch set 511 through the high-frequency ripple filter 512 without passing the any power electronic switches in the power electronic switch set 511. Thereby, the manufacture cost of the reactive power compensator device 5 is more reduced.

In the illustrated second embodiment, the AC capacitor set 50 can effectively block a DC voltage generated from the power converter 51 to the power source 1 that permits one power line of the power source 1 to directly connect to the negative DC terminal of the power electronic switch set 511. Alternatively, it also permits one power line of the power source 1 to directly connect to a positive DC terminal of the power electronic switch set 511 that accomplishes the same effect in operation.

Figure 6:
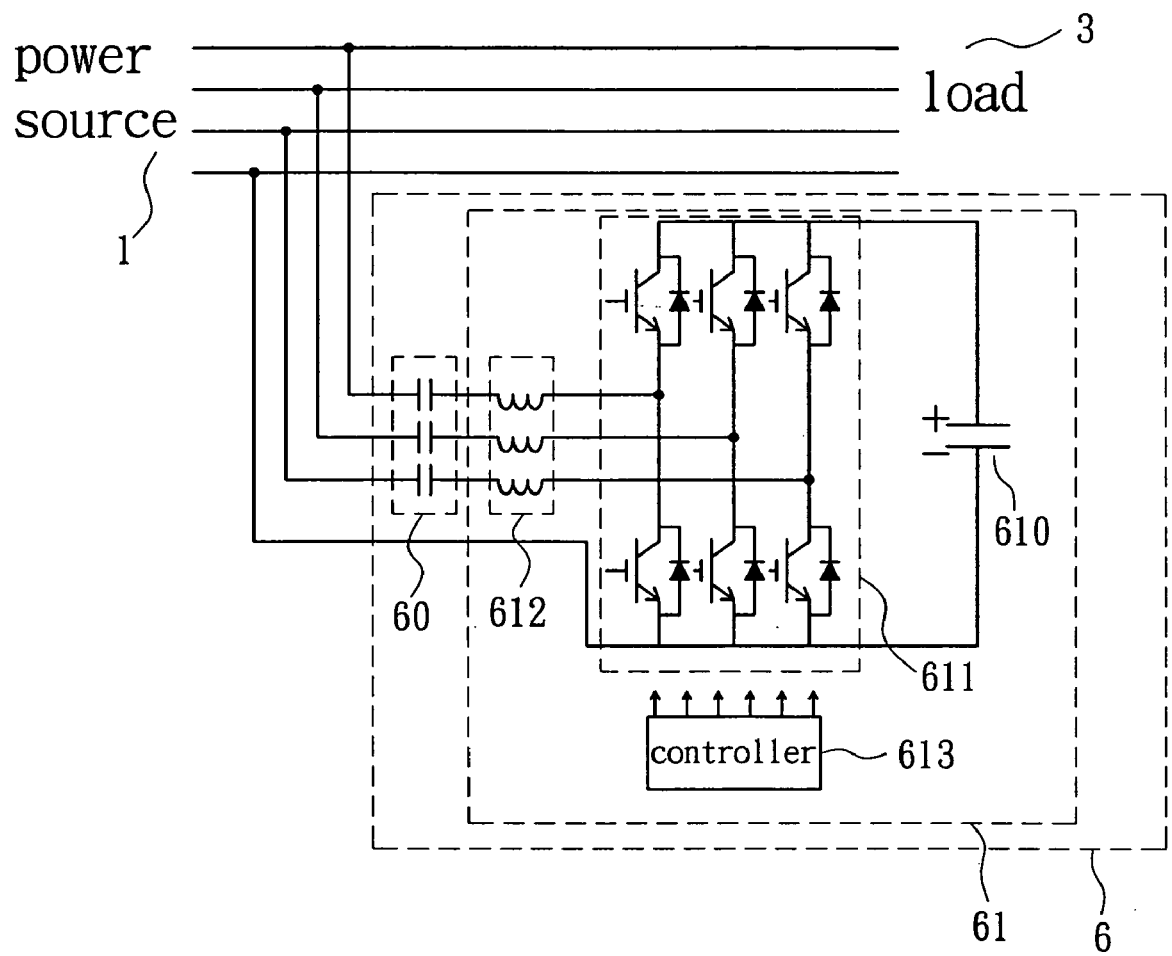
FIG. 6 is a schematic circuitry of a reactive power compensator device in accordance with a third embodiment of the present invention applied to a three-phase, four-wire power system.

Turning now to FIG. 6, it illustrates a schematic circuitry of a reactive power compensator device in accordance with a third embodiment of the present invention applied to a three-phase, four-wire power system. A power source 1 of the three-phase, four-wire power system supplies a three-phase, four-wire power to a load 3.

Still referring to FIG. 6, in the illustrated third embodiment, the reactive power compensator device 6 is applied to the three-phase, four-wire power system. Generally, the reactive power compensator device 6 consists of an AC capacitor set 60 and a power converter 61 serially connected thereto. Basically, the AC capacitor set 60 includes three AC capacitors, which are applied to the three-phase, four-wire power system and adapted to provide with a fundamental reactive power. The AC capacitor set 60 is also used to withstand major fundamental component of the phase voltage generated from the power source 1 that may lower the capacity of the power converter 61. Additionally, the fundamental reactive power from the AC capacitor set 60 can also block a DC voltage generated from the power converter 61 to the power source 1.

Still referring to FIG. 6, the power converter 61 is used to solve the power resonance and the harmonic current injection problems of AC capacitor, or permits the reactive power compensator device 6 to provide with a compensation reactive power that can be adjusted within a predetermined range in response to the load variation. Basically, the power converter 61 consists of a DC capacitor 610, a power electronic switch set 611, a high-frequency ripple filter 612 and a controller 613. The DC capacitor 610 acts as an energy buffer, and provides with a DC voltage for normally operating the power converter 61.

The power electronic switch set 611 has a triple-arm bridge structure and each arm of which includes a pair of power electronic switches. Each power electronic switch consists of a controllable switching device (such as IGBT, POWER MOSFET) and a diode. The triple-arm bridge structure of the power electronic switch set 611 contains two DC terminals and three AC terminals. A connection point between the two power electronic switches of each arm of the bridge structure is regarded as one of the three AC terminals. The other two terminals of the bridge structure are the two DC terminals denoted as a positive DC terminal and a negative DC terminal. Two DC terminals of the power electronic switch set 611 are connected to the dc capacitor 610.

The high-frequency ripple filter 612 is an inductor set adapted to filter a high-frequency ripple current which is caused by switching operation of the power electronic switch set 611. In switching operation, the controller 613 generates drive signal and sends it to control the power electronic switch set 611.

In the illustrated third embodiment, since the power converter 61 connects to the power source 1 through the AC capacitor set 60, the AC capacitor set 60 can effectively block a DC voltage generated from the power converter 61 to the power source 1. Hence, only a triple-arm structure of the power electronic switch set 611 is required when the power converter 61 is applied to a three-phase, four-wire power system. Basically, the three-phase, four-wire power source 1 includes three power lines and a neutral power line, as shown in the upper portion of FIG. 6. The three power lines of the power source 1 connect with the three AC terminals of the power electronic switch set 611 through AC power capacitor set of the AC capacitor set 60 and high-frequency ripple filter 612. The neutral power line of the power source 1 connects directly with a negative DC terminal of the power electronic switch set 611.

In operation, switching the power electronic switch set 611 controls the compensation current from the three phases of the reactive power compensator device 6. The sum of three-phase currents of the three-phase, four-wire power system is the neutral power line current. In the illustrated third embodiment, if the power converter set 611 of the power converter 61 can be controlled to obtain accurate three phase compensation currents which are balanced, the neutral power line current of the reactive power compensator device 6 is the sum of three phase compensation currents and its value is near zero. Consequently, the reactive power compensator device 6 supplies the accurate compensation currents. When the three-phase compensation currents are injected into the three power lines of the power source 1, the reactive power compensator device 6 can improve the power factor of the loads 3.

Still referring to FIG. 6, the reactive power compensator device 6 includes the AC capacitor set 60 and the power converter 61 serially connected thereto such that the power converter 61 can control the reactive power compensator device 6 to provide the fundamental reactive power currents with fixed amplitude or adjustable amplitude. Thereby, it can avoid the power resonance problem between the AC capacitor set 60 and the reactance of the power source 1, and the injection of harmonic current from neighboring non-linear loads. Due to the existence of the AC capacitor set 60, it can lower the operating voltage of the DC capacitor 610 and the capacity of the power converter 61. Thereby, the manufacture cost of the reactive power compensator device 6 applied in the distribution power system is reduced.

Furthermore, since the AC capacitor set 60 can effectively block a DC voltage generated from the power converter 61 to the power source 1, it permits the power converter 61 to omit an arm of the bridge structure of power electronic switch set 211. This means that two power electronics switches are reduced. In consequence, it permits the neutral power line of the power source 1 to directly connect to the negative DC terminal of the power electronic switch set 611 through the high-frequency ripple filter 612 without passing any power electronic switch in the power electronic switch set 611 Thereby, the manufacture cost of the reactive power compensator device 6 is more reduced.

In the illustrated third embodiment, the AC capacitor set 60 can effectively block a DC voltage generated from the power converter 61 that permits the neutral power line of the power source 1 to directly connect to the negative DC terminal of the power electronic switch set 611 through the high-frequency ripple filter 612. Alternatively, it also permits one power line of the power source 1 to directly connect to a positive DC terminal of the power electronic switch set 611 through the high-frequency ripple filter 612 that accomplishes the same effect in operation.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A reactive power compensator device comprising:
   an AC capacitor set providing a fundamental reactive power;
   a power converter serially connected with the AC capacitor set, said power converter comprising:
   a power electronic switch set having a bridge configuration providing one or more arms according to a phase number of power systems, and containing two DC terminals and one or more AC terminals depending on the number of arms;
   a DC capacitor acting as an energy buffer to supply the power electronic switch set with a dc voltage;
   a high-frequency ripple filter adapted to filter a high-frequency ripple current generated by a switching operation of the power electronic switch set; and
   a controller arranged to generate drive signals and sent them to the power electronic switch set such that the power converter controls reactive power compensation to provide a fundamental reactive power current.
   wherein one power line of the power system connects to one of the two DC terminals of the power electronic switch set without passing through any power electronic switch to permit omission of one arm of the power electronic switch set; and
   wherein switching the power electronic switch set controls said reactive power compensator device to supply a nearly sinusoidal compensation current; whereby the serial connection of the AC capacitor with the power converter avoids problems of power resonance and harmonic current injection and reduce the capacity of the power converter.

2. The reactive power compensator device as defined in claim 1, wherein each of said arm of the power electronic switch set consists of a pair of power electronic switches, and a connection point between the two power electronic switches is regarded as said AC terminal.

3. The reactive power compensator device as defined in claim 1, wherein the two dc terminals of power electronic switch set include a positive DC terminal and a negative DC terminal.

4. The reactive power compensator device as defined in claim 1, wherein the power converter can selectively provide a fundamental reactive power with a fixed amplitude, or a compensation reactive power being adjusted within a predetermined range in response to the load variation.

5. The reactive power compensator device as defined in claim 1, wherein when the power converter is applied to a three-phase three-wire power system provided with three power lines, a two arms bridge configuration and two ac terminals for the power electronic switch set of the power converter is provided.

6. The reactive power compensator device as defined in claim 5, wherein the two power lines of the three-phase three-wire power system connect to two AC terminals of the two arms bridge configuration of the power electronic switch set via the AC capacitor and the high-frequency ripple filter; alternatively, the other power line of the three-phase three-wire power system directly connects to a negative DC terminal of the power electronic switch set via the AC capacitor and the high-frequency ripple filter.

7. The reactive power compensator device as defined in claim 5, wherein the two power lines of the three-phase three-wire power system connect to two AC terminals of the two arms bridge configuration of the power electronic switch set via the AC capacitor set and the high-frequency ripple filter; alternatively, the other power line of the three-phase three-wire power system directly connects to a positive DC terminal of the power electronic switch set via the AC capacitor set and the high-frequency ripple filter.

8. The reactive power compensator device as defined in claim 1, wherein when the power converter is applied to a single-phase power system provided with two power lines, a single arm configuration and an ac terminal for the power electronic switch set of the power converter is provided.

9. The reactive power compensator device as defined in claim 8, wherein one of the power lines of the single-phase power system connects to an AC terminal of the one arm bridge configuration of the power electronic switch set via the AC capacitor set and the high-frequency ripple filter; alternatively, the other power line of the single-phase power system directly connects to a negative DC terminal of the power electronic switch set.

10. The reactive power compensator device as defined in claim 8, wherein one of the power lines of the single-phase power system connects to an AC terminal of the one arm bridge configuration of the power electronic switch set via the AC capacitor set and the high-frequency ripple filter; alternatively, the other power line of the single-phase power system directly connects with a positive DC terminal of the power electronic switch set.

11. The reactive power compensator device as defined in claim 1, wherein when the power converter is applied to a three-phase four-wire power system provided with three-phase power lines and a neutral power line, a three arms configuration and three ac terminals for the power electronic switch set of the power converter is provided.

12. The reactive power compensator device as defined in claim 11, wherein three-phase power lines of the three-phase four-wire power system connect to three AC terminals of the three arms bridge configuration of the power electronic switch set via the AC capacitor set and the high-frequency ripple filter; alternatively, the neutral power line of the three-phase four-wire power system directly connects to a negative DC terminal of the power electronic switch.

13. The reactive power compensator device as defined in claim 11, wherein three-phase power lines of the three-phase four-wire power system connect to three AC terminals of the three arms bridge configuration of the power electronic switch set via the AC capacitor set and the high-frequency ripple filter; alternatively, the neutral power line of the three-phase four-wire power system directly connects to a positive DC terminal of the power electronic switch set.

14. The reactive power compensator device as defined in claim 1, wherein the high-frequency ripple filter is an inductor set.

* * * * *